(No Model.)
W. REID & J. H. BULLARD.
BICYCLE STAND.
No. 537,583. Patented Apr. 16, 1895.
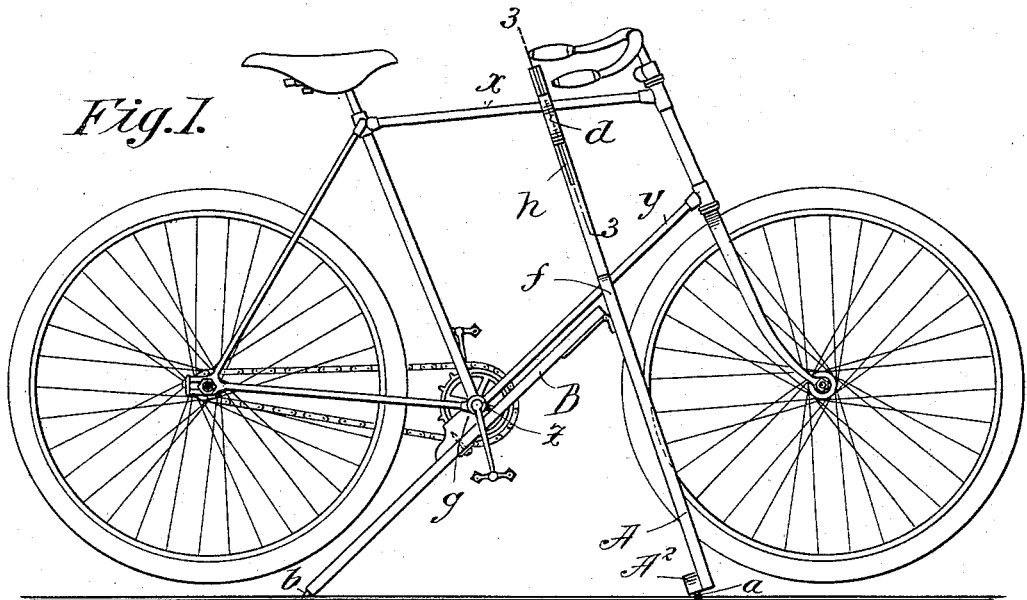
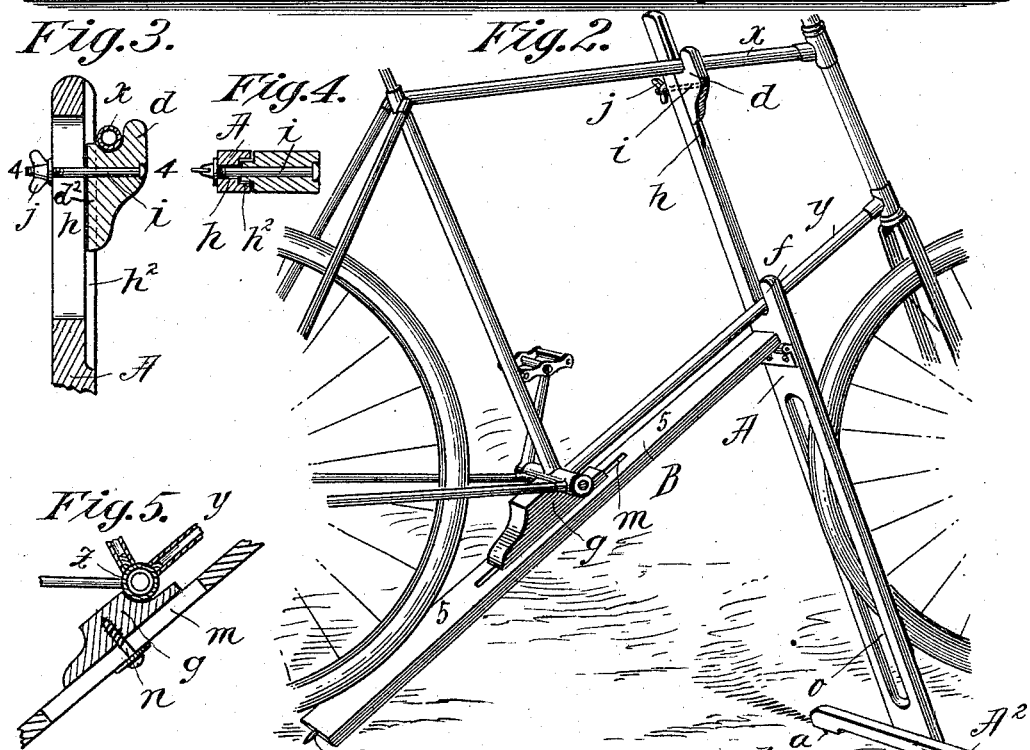
Witnesses:
J. W. Garfield,
K. I. Clemons
Inventors:
William Reid, and
James H. Bullard.
by Chapin &c.
Attorneys.

UNITED STATES PATENT OFFICE.

WILLIAM REID AND JAMES H. BULLARD, OF SPRINGFIELD, MASSACHUSETTS.

BICYCLE-STAND.

SPECIFICATION forming part of Letters Patent No. 537,583, dated April 16, 1895.

Application filed February 25, 1895. Serial No. 539,541. (No model.)

*To all whom it may concern:*

Be it known that we, WILLIAM REID and JAMES H. BULLARD, citizens of the United States of America, residing at Springfield, in the county of Hampden and State of Massachusetts, have invented new and useful Improvements in Bicycle-Stands, of which the following is a specification.

The object of this invention is to provide a support which will sustain bicycles free from the floor, so that they may be cleaned and lubricated and so that the tires will not have to sustain the weight of the machine when jacked up.

The invention consists in the bicycle support composed of parts and arrangements, and having appliances all substantially as will hereinafter fully appear and be set forth in the claims.

Reference is to be had to the accompanying drawings, in which—

Figure 1 is a side elevation showing the support set up and sustaining a bicycle. Fig. 2 is a perspective view in substance the same. Fig. 3 is a sectional view in detail on line 3—3, Fig. 1. Fig. 4 is a cross section on line 4—4, Fig. 3. Fig. 5 is a longitudinal section in detail on line 5—5, Fig. 2.

The support comprises the oblique upright, A, having the widened base or part, $A^2$, with the spurs, $a$, and hinged to this upright, intermediately thereof, is the rearwardly and downwardly extended brace bar, B, with the spur, $b$, also at its lower end. The upright, A, has the two upwardly opening hooks, $d, f$, at different heights thereon, sidewise applied, in which may be set the upper and lower bars, $x, y$, of the frame of the bicycle. The said brace-bar, B, has the seat, $g$, for the reception of the crank-shaft-hanger, $z$. The upright and brace-bar may be advantageously and economically constructed of wood. The upper hooked-support is adjustable vertically on the upright. The upright is slotted and rabbeted, as seen at $h, h^2$,—Figs. 3 and 4,—and the separately formed part, $d$, is tongued, as at $d^2$, to fit within the rabbeted border of the slot. The shank of the headed bolt, $i$, is passed through the hooked block, $d$, and receives at its end the thumb-nut, $j$, which clamps the block firmly in place. The seat, $g$, for the crank-shaft bracket is also constituted by a block which is also adjustable longitudinally on the bar of the support on which it is applied. Here, also, the bar, B, is slotted, as seen at $m$, and the seat-block is adjustably confined by the screw or bolt, $n$. See Fig. 5.

The widened lower part of the upright bar, A, has the vertical aperture, $o$, for the accommodation of the rear part of the front wheel which, when the machine is jacked up, may protrude therethrough.

The availability of the bicycle support and the adaptation thereof to machines having frames of different heights, sizes, or proportions, will be apparent from the foregoing description and the accompanying illustrations.

Having thus described our invention, what we claim, and desire to secure by Letters Patent, is—

1. A bicycle stand consisting of the upright, A, having, at different heights thereon, seats or rests for the forward upper and lower members of the bicycle frame, and the brace-bar, B, hinged to the upright, upon which the latter has a leaning support, and having a seat or rest for the crank-shaft bracket, substantially as described.

2. A bicycle stand consisting of the upright, A, having, at different heights thereon, seats or rests for the forward upper and lower members of the bicycle frame, one of which is vertically adjustable and the brace-bar, B, hinged to an intermediate part of the upright,—upon which the latter has a leaning support,—and said bar having a seat or rest for the crank-shaft bracket, substantially as described.

3. A bicycle stand consisting of the upright, A, having, at different heights thereon, seats or rests for the forward upper and lower members of the bicycle frame, and the brace-bar, B, hinged to an intermediate part of the support and rearwardly and downwardly extended therefrom, and having, intermediately thereon, a seat for the crank-shaft bracket which is longitudinally adjustable along the said brace-bar, substantially as described.

WILLIAM REID.
JAMES H. BULLARD.

Witnesses:
WM. S. BELLOWS,
K. I. CLEMONS.